US008977611B2

(12) United States Patent
Tseng

(10) Patent No.: US 8,977,611 B2
(45) Date of Patent: Mar. 10, 2015

(54) RANKING OBJECTS BY SOCIAL RELEVANCE

(75) Inventor: Erick Tseng, San Francisco, CA (US)

(73) Assignee: Facebook, Inc., Menlo Park, CA (US)

( * ) Notice: Subject to any disclaimer, the term of this patent is extended or adjusted under 35 U.S.C. 154(b) by 23 days.

(21) Appl. No.: 13/276,216

(22) Filed: Oct. 18, 2011

(65) Prior Publication Data

US 2013/0097180 A1 Apr. 18, 2013

(51) Int. Cl.
*G06F 17/30* (2006.01)

(52) U.S. Cl.
CPC .... *G06F 17/30867* (2013.01); *G06F 17/30722* (2013.01)
USPC .......................................... 707/728; 705/319

(58) Field of Classification Search
None
See application file for complete search history.

(56) References Cited

U.S. PATENT DOCUMENTS

| | | | | |
|---|---|---|---|---|
| 2007/0150498 | A1* | 6/2007 | Li et al. | 707/101 |
| 2007/0226248 | A1* | 9/2007 | Darr | 707/102 |
| 2008/0288587 | A1* | 11/2008 | Bahrs et al. | 709/204 |
| 2009/0091087 | A1* | 4/2009 | Wasmund | 273/430 |
| 2009/0132345 | A1* | 5/2009 | Meyssami et al. | 705/10 |
| 2009/0144075 | A1* | 6/2009 | Flinn et al. | 705/1 |
| 2010/0153862 | A1* | 6/2010 | Schreiber | 715/760 |
| 2012/0173820 | A1* | 7/2012 | Venkataramani | 711/124 |

FOREIGN PATENT DOCUMENTS

| | | | |
|---|---|---|---|
| JP | 2010-218376 | A | 9/2010 |
| JP | 2011-170471 | A | 9/2011 |
| KR | 10-2011-0086233 | A | 7/2011 |
| KR | 10-1073602 | B1 | 10/2011 |
| WO | 2008-137590 | A2 | 11/2008 |

OTHER PUBLICATIONS

International Search Report and Written Opinion for International Application PCT/US2012/055278, Mar. 12, 2013.

* cited by examiner

*Primary Examiner* — Wilson Lee
(74) *Attorney, Agent, or Firm* — Baker Botts L.L.P.

(57) ABSTRACT

In one embodiment, a system includes one or more computing systems that implement a social networking environment and are operable to access stored information including a plurality of nodes including a first set of user nodes that each correspond to a respective user and a second set of concept nodes that each correspond to a respective concept. The system may generate a match coefficient for the user and concept, representing the degree of relevance of a particular concept node to a particular user node.

57 Claims, 8 Drawing Sheets

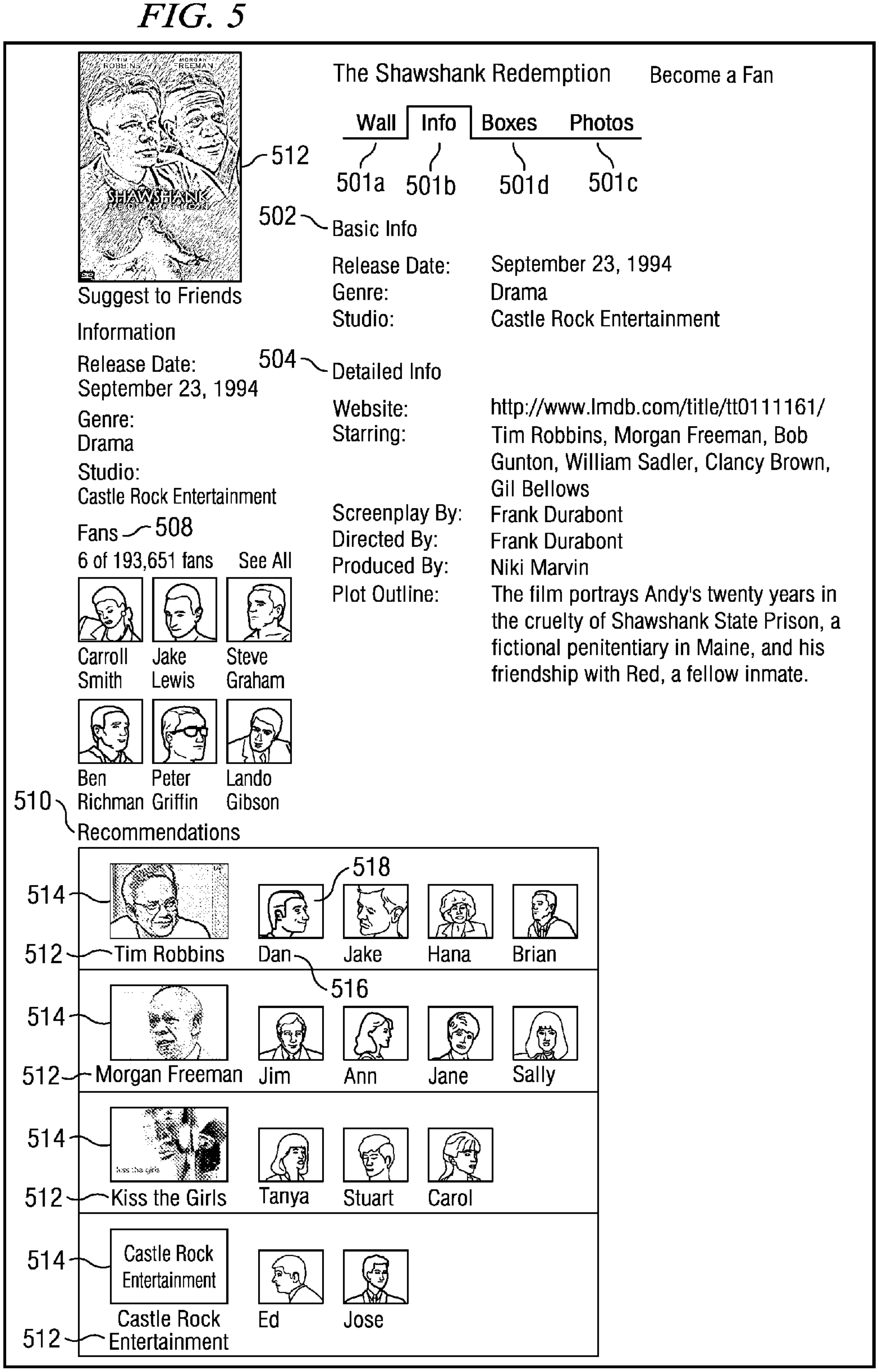

*FIG. 5*

The Shawshank Redemption    Become a Fan

| Wall | Info | Boxes | Photos |
| 501a | 501b | 501d | 501c |

512

502 — Basic Info

Release Date:    September 23, 1994
Genre:           Drama
Studio:          Castle Rock Entertainment Suggest to Friends Information Release Date:   504 — Detailed Info
September 23, 1994

Website:    http://www.Imdb.com/title/tt0111161/
Genre:
Drama
Starring:   Tim Robbins, Morgan Freeman, Bob
Studio:                 Gunton, William Sadler, Clancy Brown,
Castle Rock Entertainment       Gil Bellows
Screenplay By:  Frank Durabont
Fans — 508
Directed By:    Frank Durabont
6 of 193,651 fans   See All
Produced By:    Niki Marvin
Plot Outline:   The film portrays Andy's twenty years in
                the cruelty of Shawshank State Prison, a
Carroll  Jake    Steve           fictional penitentiary in Maine, and his
Smith   Lewis   Graham           friendship with Red, a fellow inmate.

Ben     Peter   Lando
510 — Richman Griffin  Gibson

Recommendations 518
514 —
512 — Tim Robbins   Dan   Jake   Hana   Brian 516
514 —
512 — Morgan Freeman  Jim   Ann   Jane   Sally 514 —
512 — Kiss the Girls   Tanya   Stuart   Carol 514 — Castle Rock
      Entertainment
      Castle Rock    Ed    Jose
512 — Entertainment

RANKING OBJECTS BY SOCIAL RELEVANCE

TECHNICAL FIELD

The present disclosure relates generally to social networking, and more particularly, utilizing an integrated social network environment and social graph based on the social network environment to rank objects by their relevance to a particular user node. The social graph includes nodes representing users and concepts in the social network environment as well as edges that define or represent connections between such nodes. The social relevance of any object to a particular user node may be calculated by cross referencing the nodes connected to the user node with the nodes connected to the object node.

BACKGROUND

Computer users are able to access and share vast amounts of information through various local and wide area computer networks including proprietary networks as well as public networks such as the Internet. Typically, a web browser installed on a user's computing device facilitates access to and interaction with information located at various network servers identified by, for example, associated uniform resource locators (URLs). Conventional approaches to enable sharing of user-generated content include various information sharing technologies or platforms such as social networking websites. Such websites may include, be linked with, or provide a platform for applications enabling users to view "profile" pages created or customized by other users where visibility and interaction with such profiles by other users is governed by some characteristic set of rules. By way of example, a user profile may include such user-declared information as contact information, background information, job/career information, as well as interests.

A traditional social network is a social structure made of individuals, groups, entities, or organizations generally referred to as "nodes," which are tied (connected) by one or more specific types of interdependency. Social network (graph) analysis views social relationships in terms of network theory consisting of nodes and edges. Nodes are the individual actors within the networks, and edges are the relationships between the actors. The resulting graph-based structures are often very complex. There can be many kinds of edges between nodes. In its simplest form, a social network, or social graph, is a map of all of the relevant edges between all the nodes being studied.

The relevance of a node in relation to a particular user may be determined through analysis of the social graph. By calculating a relevance score of a node to a particular individual, content delivery is greatly enhanced and the user experience is improved.

BRIEF DESCRIPTION OF THE DRAWINGS

FIG. 5 illustrates an example concept profile page.

DESCRIPTION OF EXAMPLE EMBODIMENTS

Figure 1:
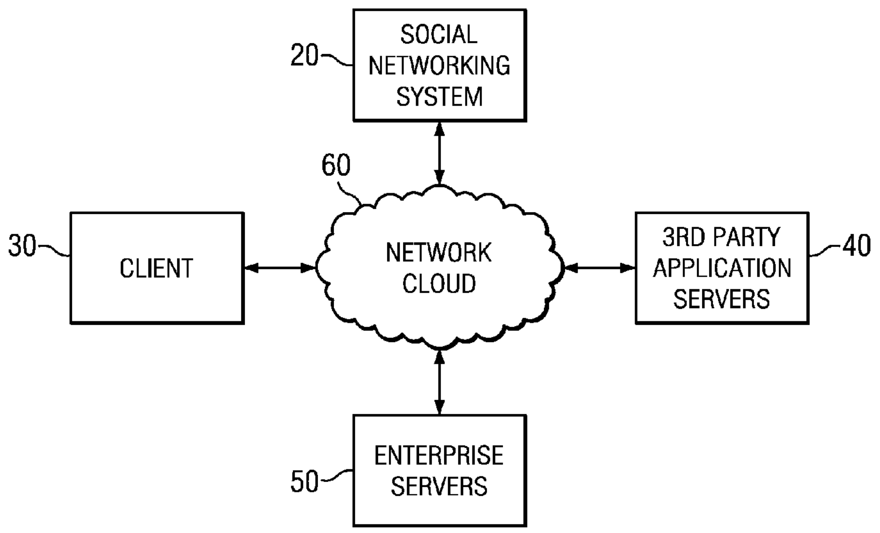
FIG. 1 illustrates an example computer network environment of an example social network environment.

Particular embodiments relate to a social network environment that includes an infrastructure or platform (hereinafter infrastructure and platform may be used interchangeably) enabling an integrated social network environment. In the present disclosure, the social network environment may be described in terms of a social graph including social graph information. In particular embodiments, one or more computing systems of the social network environment implementing the social network environment include, store, or have access to a data structure that includes social graph information for use in implementing the social network environment described herein.

In particular embodiments, the social graph information includes a first set of user nodes that each correspond to a respective user, and a second set of concept nodes that each correspond to a respective concept. As used herein, a "user" may be an individual (human user), an entity (e.g., an enterprise, business, or third party application), or a group (e.g., of individuals or entities) that interacts or communicates with or over such a social network environment. As used herein, a "concept" may refer to virtually anything that a user may declare or otherwise demonstrate an interest in, a like towards, or a relationship with, such as, by way of example, a sport, a sports team, a genre of music, a musical composer, a hobby, a business (enterprise), an entity, a group, a third party application, a celebrity, a person who is not a registered user, etc. In particular embodiments, each node has, represents, or is represented by, a corresponding web page ("profile page") hosted or accessible in the social network environment.

By way of example, a user node may have a corresponding user profile page in which the corresponding user can add content, make declarations, and otherwise express him or herself, while a concept node may have a corresponding concept profile page ("hub") in which a plurality of users can add content, make declarations, and express themselves, particularly in relation to the concept. In particular embodiments, the social graph information further includes a plurality of edges that each define or represent a connection between a corresponding pair of nodes in the social graph.

In particular embodiments, the social graph contains subcategories of concept nodes. First, attribute nodes are concept nodes that are connected to user nodes or other concept nodes that do not necessarily have a corresponding hub page, and are not necessarily visible to users of the social network. For example, the social network may infer that, based on a particular user's edge connections to sports games, that the user has an affinity for "sports" or "action games." These attribute nodes are dynamically generated by the social network, and generally the hub page for such a broad category would be nonsensical or provide little or no use to users of the social network. Similarly, if a user expresses an affinity to such a narrow concept that it would not make sense for the concept to have a hub page, the affinity is tracked on the social graph as an attribute node, but not publicly visible to users. For example, if a user checks-in at a particular restaurant with a hub page and also expresses an affinity for a particular dish at the restaurant (e.g., "the foie gras at Restaurant X is amazing."), the social network may use natural-language programming to determine an affinity, such as a "like" for an attribute node (foie gras at Restaurant X). In particular embodiments, when the number of connections to an attribute node exceeds a predetermined number, the social network dynamically creates a hub page for the attribute node. In particular embodiments, the social network will message the administrator of the concept node associated with the attribute node (in this example, the administrator of Restaurant X), and query whether he or she would like a subpage created for the attribute node.

In particular embodiments, object nodes are a subset of concept nodes that are associated with a particular user. The user may explicitly create the object node, or it may be dynamically created by the social network for the user. For example, the publisher of a game or application may create an object node when it uploads the application to the app store for purchase and download by other users. At the time of creation, the publisher may tag attributes of the object node, such as the genre/category, publish date, version, etc. In particular embodiments, these meta-data tags may be associated with existing attribute nodes (such as "action" or "sports" as described above). In particular embodiments, no user tagging is required when the object node is created. For example, when an artist or band uploads their new album to a music store, the social network may automatically pull genre information from ID3 tags or information from the band's hub page. Although the disclosure describes ranking object nodes for a particular user node via connected attribute nodes, the algorithm is not limited to this configuration. As used herein, object nodes may be any concept node, attribute nodes may be any concept node.

In some embodiments, each edge may be one of a plurality of edge types based at least in part on the types of nodes that the edge connects in the social graph. By way of example, in one particular embodiment, each edge from a first edge type defines a connection between a pair of user nodes from the first set, while each edge from a second edge type defines a connection between a user node from the first set and a concept node from the second set. Furthermore, each edge from a third edge type may define a connection between a pair of concept nodes from the second set. In such embodiments, the edge itself may store, or be stored with, data that defines a type of connection between the pair of nodes the edge connects, such as, for example, data describing the types of the nodes the edge connects (e.g., user or concept), access privileges of an administrator of one of the pair of nodes connected by the edge with respect to the other node the edge connects to (e.g., read or write access of an administrator of one node with respect to the other node connected by the edge), or data describing how or why the edge was first initialized or created (e.g., in response to an explicit user action or declaration, or automatically without an explicit user action), the strength of the connection as determined by various factors or criteria related to or shared by the nodes connected by the edge, among other suitable or relevant data. In an alternate embodiment, each edge may simply define or represent a connection between nodes regardless of the types of nodes the edge connects; that is, the edge itself may store, or be stored with, identifiers of the nodes the edge connects but may not store, or be stored with, data that describes a type of connection between the pair of nodes the edge connects. Furthermore, in any of these or other embodiments, data that may indicate the type of connection or relationship between nodes connected by an edge may be stored with the nodes themselves.

In particular embodiments, a concept database includes an index of known concepts as well as, in some embodiments, various attributes, metadata, or other information associated with the respective concepts. In particular embodiments, one or more backend (server-side) processes crawl one or more external data sources (e.g., WIKIPEDIA (www.wikipedia.org), FREEBASE (www.freebase.com, available from METAWEB), or the internet in general) to facilitate or aid in generating or populating the concept database. In some embodiments, the concept database may also be augmented with information extracted from users of the social network environment described herein.

Particular embodiments further relate to a method for ranking object nodes in order of relevance for a particular user. In particular embodiments, one or more server-side ranking processes generate the rankings of a set of object nodes for display to the user based on a match coefficient between the particular user node and each of the set of object nodes. More particularly, the one or more server-side ranking processes may determine, for each attribute node connected to the user node, the degree of importance of that attribute node to the user node, and similarly Various portions of such a social networking platform may be implemented via a hardware architecture or software framework that enables various software components or processes to implement particular embodiments, as is described in more detail, by way of example and not by way of limitation, below. The platform may include one or more hardware or software components, one or more of which may be located or embodied in one or more consolidated or distributed computing systems. Additionally, as used herein, "or" may imply "and" as well as "or;" that is, "or" does not necessarily preclude "and," unless explicitly stated or implicitly implied.

As just described, in various example embodiments, one or more described web pages or web applications are associated with a social network environment or social networking service. As used herein, a "user" may be an individual (human user), an entity (e.g., an enterprise, business, or third party application), or a group (e.g., of individuals or entities) that interacts or communicates with or over such a social network environment. As used herein, a "registered user" refers to a user that has officially registered within the social network environment (Generally, the users and user nodes described herein refer to registered users only, although this is not necessarily a requirement in other embodiments; that is, in other embodiments, the users and user nodes described herein may refer to users that have not registered with the social network environment described herein). In particular embodiments, a registered user has a corresponding "profile" page stored or hosted by the social network environment and viewable by all or a selected subset of other users. Generally, a user has administrative rights to all or a portion of his or her own respective profile page as well as, potentially, to other pages created by or for the particular user including, for example, home pages, pages hosting web applications, among other possibilities. As used herein, an "authenticated user" refers to a user who has been authenticated by the social network environment as being the user claimed in a corresponding profile page to which the user has administrative rights or, alternately, a suitable trusted representative of the claimed user.

As used herein, a "connection" may represent a defined relationship between users or concepts of the social network environment, which can be defined logically in a suitable data structure of the social network environment and can be used to define a relationship (hereinafter referred to as an edge) between the nodes corresponding to the users or concepts of the social network environment for which the connection has been made. As used herein, a "friendship" represents a connection, such as a defined social relationship, between a pair of users of the social network environment. A "friend," as used herein, may refer to any user of the social network environment with which another user has formed a connection, friendship, association, or relationship with, causing an edge to be generated between the two users. By way of example, two registered users may become friends with one another explicitly such as, for example, by one of the two users selecting the other for friendship as a result of transmitting, or causing to be transmitted, a friendship request to the other user, who may then accept or deny the request. Alternately, friendships or other connections may be automatically established. Such a social friendship may be visible to other users, especially those who themselves are friends with one or both of the registered users. A friend of a registered user may also have increased access privileges to content, especially user-generated or declared content, on the registered user's profile or other page. It should be noted, however, that two users who have a friend connection established between them in the social graph may not necessarily be friends (in the conventional sense) in real life (outside the social networking environment). For example, in some implementations, a user may be a business or other non-human entity, and thus, incapable of being a friend with a human being user in the traditional sense of the word.

As used herein, a "fan" may refer to a user that is a supporter of a particular web page, web application, or other web content accessible in the social network environment. In particular embodiments, when a user is a fan of a particular web page ("fans" the particular web page), the user may be listed on that page as a fan for other registered users or the public in general to see. Additionally, an avatar or profile picture of the user may be shown on the page (or in/on any of the pages described below). As used herein, a "like" may refer to something, such as, by way of example and not by way of limitation, an interest, a link, a piece of media (e.g., photo, photo album, video, song, etc.) a concept, an entity, or a page, that a user, and particularly a registered or authenticated user, has declared or otherwise demonstrated that he or she likes, is a fan of (as used herein in various example embodiments, to "like" or to "fan" something, such as a concept or concept profile page, may be defined equivalently in the social networking environment and may be used interchangeably; similarly, to declare oneself a "fan" of something, such as a concept or concept profile page, or to declare that oneself "likes" the thing, may be defined equivalently in the social networking environment and used interchangeably herein), supports, enjoys, or otherwise has a positive view of. As used herein, an "interest" may refer to a user-declared interest, such as a user-declared interest presented in the user's profile page. As used herein, a "want" may refer to virtually anything that a user wants. As described above, a "concept" may refer to virtually anything that a user may declare or otherwise demonstrate an interest in, a like towards, or a relationship with, such as, by way of example, a sport, a sports team, a genre of music, a musical composer, a hobby, a business (enterprise), an entity, a group, a celebrity, a person who is not a registered user, or even, in some embodiments, another user (e.g., a non-authenticated user), etc. By way of example, there may be a concept node and concept profile page for "Jerry Rice," the framed professional football player, created and administered by one or more of a plurality of users (e.g., other than Jerry Rice), while the social graph additionally includes a user node and user profile page for Jerry Rice created by and administered by Jerry Rice, himself. In particular embodiments, as will be described in more detail below, a friend connection or friendship may define or indicate a logical connection defined or represented by an edge between user nodes in the social graph, while a like, want, fan, or other connection demonstrating, generally, an interest or association may define a logical connection or edge between a user node and a concept node in the social graph (and in some embodiments, between two user nodes, or between two concept nodes). Other edge types can correspond to particular actions a user has undertaken relative to an object, such as a song or movie. For example, additional edge types may include edge types corresponding to purchasing content or objects, viewing or listening to content, sharing content, bookmarking content, and the like.

Particular embodiments may operate in, or in conjunction with, a wide area network environment, such as the Internet, including multiple network addressable systems. FIG. 1 illustrates an example network environment, in which various example embodiments may operate. Network cloud 60 generally represents one or more interconnected networks, over which various systems and hosts described herein may communicate. Network cloud 60 may include packet-based wide area networks (such as the Internet), private networks, wireless networks, satellite networks, cellular networks, paging networks, and the like. As FIG. 1 illustrates, particular embodiments may operate in conjunction with a network environment comprising social network environment 20 and client devices 30, as well as, in some embodiments, one or more third party web application servers 40 or one or more enterprise servers 50. Client devices 30, web application servers 40, and enterprise servers 50 may be operably connected to the network environment and network cloud 60 via a network service provider, a wireless carrier, a set of routers or networking switches, or any other suitable means.

Each client device 30, web application server 40, or enterprise server 50 may generally be a computer, computing system, or computing device (such as that described below with reference to FIG. 8) including functionality for communicating (e.g., remotely) over a computer network. Client device 30 in particular may be a desktop computer, laptop computer, personal digital assistant (PDA), in- or out-of-car navigation system, smart phone or other cellular or mobile device, or mobile gaming device, among other suitable computing devices. Client device 30 may execute one or more client applications, such as a web browser (e.g., MICROSOFT WINDOWS INTERNET EXPLORER, MOZILLA FIREFOX, APPLE SAFARI, GOOGLE CHROME, AND OPERA, etc.), to access and view content over a computer network 60. In particular implementations, the client applications allow a user of client device 30 to enter addresses of specific network resources to be retrieved, such as resources hosted by social network environment 20, web application servers 40, or enterprise servers 50. These addresses can be Uniform Resource Locators (URLs). In addition, once a page or other resource has been retrieved, the client applications may provide access to other pages or records when the user "clicks" on hyperlinks to other resources. By way of example, such hyperlinks may be located within the web pages and provide an automated way for the user to enter the URL of another page and to retrieve that page.

More particularly, when a user at a client device 30 desires to view a particular web page (hereinafter also referred to as a target structured document) hosted by social network environment 20, or a web application hosted by a web application server 40 and made available in conjunction with social network environment 20, the user's web browser, or other client-side structured document rendering engine or suitable client application, formulates and transmits a request to social network environment 20. The request generally includes a URL or other document identifier as well as metadata or other information. By way of example, the request may include information identifying the user, such as a user ID, as well as information identifying or characterizing the web browser or operating system running on the user's client computing device 30. The request may also include location information identifying a geographic location of the user's client device or a logical network location of the user's client device, as well as timestamp identifying when the request was transmitted.

In an example implementation, when a request for a web page or structured document hosted by social network environment 20 is received by the social network environment 20, one or more page-generating processes executing within the social network environment 20 typically generate a base web page in the form of a Hyper Text Markup Language (HTML), Extensible Markup Language (XML), or other web browser-supported structured document. The generated structured document is then transmitted in a response, which may comprise one or more portions or partial responses, to the requesting client 30 via a Hypertext Transfer Protocol (HTTP) or other suitable connection for rendering by the web browser at the client device 30. The structured document may include one or more resources (e.g. JavaScript scripts, code segments, or resources, Cascading Style Sheet (CSS) code segments or resources, image data or resources, video data or resources, etc.), or references to such resources, embedded within the transmitted document. By way of example, a resource embedded in an HTML document may generally be included or specified within a script element, image element, or object element, among others, depending on the type of resource. The element referencing or specifying the resource may include a source attribute (e.g., src) identifying a location of the resource, which may be within a server or data store within social network environment 20 or at one or more external locations, to the client device 30 requesting the web page. Typically, upon receipt of the response, the web browser or other client document rendering application running at the client device 30 then constructs a document object model (DOM) representation of the received structured document and requests the resource(s) (which may be at one or more other external locations) embedded in the document.

In an example implementation, when a registered user of social network environment 20 first requests a web page from social network environment 20 in a given user session, the response transmitted to the user's client device 30 from social network environment 20 may include a structured document generated by page-generating process for rendering a login page at the client device. The user may then enter his or her user login credentials (e.g., user ID and password), which are then transmitted from the user's client device 30 to social network environment 20. Upon successful authentication of the user, social network environment 20 may then transmit a response to the user's web browser at the user's client device 30 that includes a structured document generated by page-generating process for rendering a user homepage or user profile page at the user's client device.

Figure 2A:
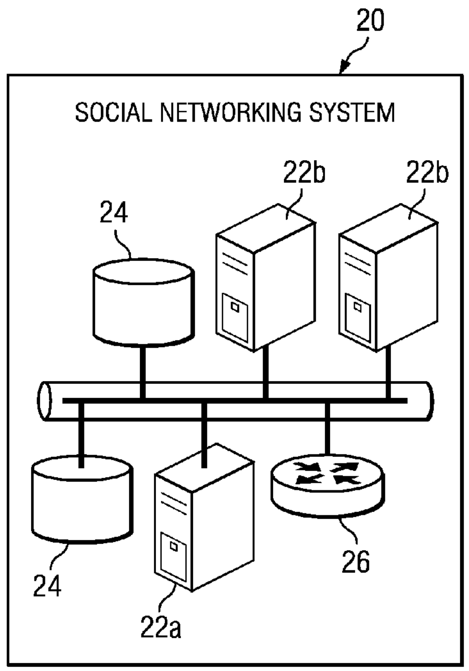
FIG. 2A illustrates example components of an example social network environment.

In one example embodiment, social network environment 20 comprises computing systems that allow users at client devices 30 to communicate or otherwise interact with each other and access content, such as user profiles, as described herein. Social network environment 20 is a network addressable system that, in various example embodiments, comprises one or more physical servers 22*a* or 22*b* (hereinafter also referred to collectively as servers 22) as well as one or more data stores collectively referred to herein as data store 24 (which may be implemented in or by one or more of a variety of consolidated or distributed computing systems, databases, or data servers), as illustrated in FIG. 2A. The one or more physical servers 22 are operably connected to computer network 60 via, by way of example, a set of routers or networking switches 26. In an example embodiment, the functionality hosted by the one or more physical servers 22 may include web or HTTP servers, FTP servers, as well as, without limitation, web pages and applications implemented using Common Gateway Interface (CGI) script, PHP Hypertext Preprocessor (PHP), Active Server Pages (ASP), Hyper Text Markup Language (HTML), Extensible Markup Language (XML), Java, JavaScript, Asynchronous JavaScript and XML (AJAX), and the like.

Physical servers 22 may host functionality directed to the operations of social network environment 20. By way of example, social network environment 20 may host a website that allows one or more users, at one or more client devices 30, to view and post information, as well as communicate with one another via the website. Hereinafter, servers 22 may be referred to as server 22, although, as just described, server 22 may include numerous servers hosting, for example, social network environment 20, as well as other content distribution servers, data stores, or databases. Data store 24 may store content and data relating to, and enabling, operation of the social network environment as digital data objects including content objects. A data object, in a particular implementation, is an item of digital information typically stored or embodied in a data file, database, or record. Content objects may take many forms, including: text (e.g., ASCII, SGML, HTML), images (e.g., jpeg, tif and gif), graphics (vector-based or bitmap), audio, video (e.g., mpeg), or other multimedia, and combinations thereof. Content object data may also include executable code objects (e.g., games executable within a browser window or frame), podcasts, etc. Logically, data store 24 corresponds to one or more of a variety of separate or integrated databases, such as relational databases and object-oriented databases, that maintain information as an integrated collection of logically related records or files stored on one or more physical systems. Structurally, data store 24 may generally include one or more of a large class of data storage and management systems. In particular embodiments, data store 24 may be implemented by any suitable physical system(s) including components, such as one or more database servers, mass storage media, media library systems, storage area networks, data storage clouds, and the like. In one example embodiment, data store 24 includes one or more servers, databases (e.g., MySQL), and/or data warehouses.

Data store 24 may include data associated with different social network environment 20 users, client devices 30, web application servers 40, or enterprise servers 50, as well as, in particular embodiments, data associated with various concepts. As described above, particular embodiments relate to a social network environment 20 that includes a platform enabling an integrated social network environment. In the following example embodiments, the social network environment may be described or implemented in terms of a social graph including social graph information. In particular embodiments, data store 24 includes a the social graph database in which the social graph information for use in implementing the social network environment described herein is stored. In particular embodiments, the social graph information stored by social network environment 20 in data store 24, and particularly in the social graph database, includes a plurality of nodes and a plurality of edges that define connections between corresponding nodes. In particular embodiments, the nodes or edges themselves are data objects that include the identifiers, attributes, and information (including the information for their corresponding profile pages) for their corresponding users or concepts (as described below), some of which is actually rendered on corresponding profile or other pages. The nodes may also include pointers or references to other objects, data structures, or resources for use in rendering content in conjunction with the rendering of the profile pages corresponding to the respective nodes.

Figure 3:
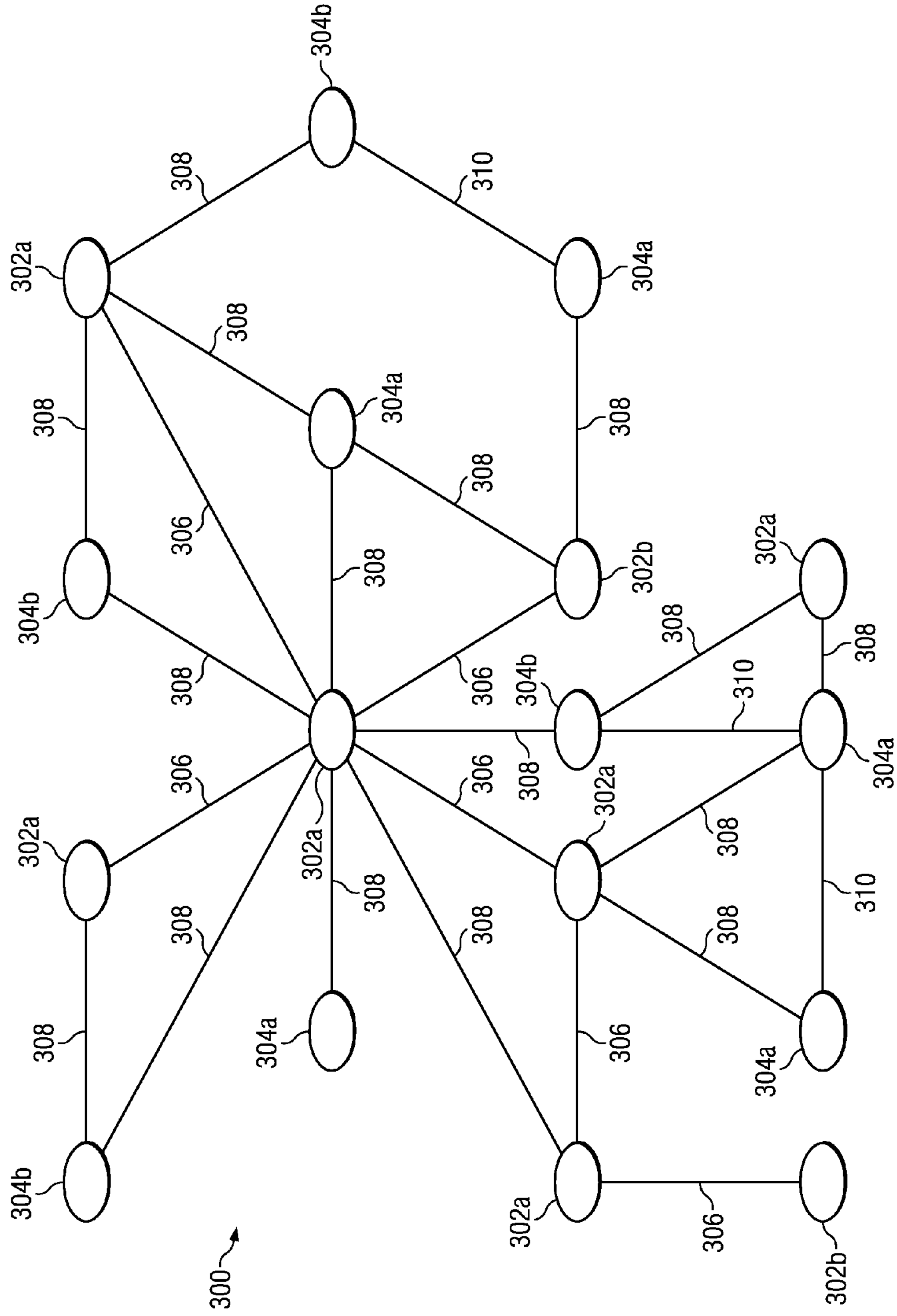
FIG. 3 illustrates an example social graph.

FIG. 3 illustrates an example social graph 300 shown, for didactic purposes, in a two-dimensional visual map representation. In particular embodiments, the plurality of nodes and edges of social graph 300 are stored as data objects in data store 24, and particularly a social graph database. Additionally, as will be described later, data store 24 may further include one or more searchable or queryable indexes of nodes or edges generated by indexing the social graph database. In particular embodiments, the plurality of nodes includes a first set of administered nodes 302 and a second set of un-administered nodes 304. In particular embodiments, the first set of administered nodes 302 are user-administered nodes (hereinafter also referred to as "user nodes") that each correspond to a respective user and a respective user profile page of that user.

In particular embodiments, user profile pages corresponding to user nodes 302 may be modified, written to, or otherwise administered by, and only by, their respective owner (registered) users (unless an official administrator of social network environment 20 in general desires or requires access to modify or delete a user's profile page, e.g., as a result of scrupulous or otherwise inappropriate action on the part of the registered user). In one particular embodiment, the first set of user nodes 302 includes a first subset of authenticated nodes 302*a* and a second subset of un-authenticated nodes 302*b*. In a particular embodiment, the first subset of authenticated nodes 302*a* correspond to respective registered authenticated users while the second subset of un-authenticated nodes 302*b* correspond to registered users who have not been authenticated by social network environment. For example, an authenticated user may be a user who has been verified to be who they claim to be in his or her respective profile page while an un-authenticated user may be a user who has not been verified to be who they claim to be in his or her respective profile page (e.g., an un-authenticated user may register a profile page in President Barack Obama's name, although the un-authenticated user is not President Obama). In some embodiments, for some existing user profile pages, social network environment 20 may determine whether the administrator of the user profile page is truly the authentic voice of the claimed user (real person the user claims to be). If it is determined that the current administrator is not the authentic or true claimed user, social network environment 20 may remove the user's administrative rights to the page. In this way, the user node and corresponding user profile page may be redefined in the social graph information stored in the social graph database as a concept node 304 and corresponding concept profile page as will be described later. It should further be noted that, in various example embodiments, user nodes 302*a* and 302*b* may or may not be classified distinctly as different node types; that is, in one embodiment, a user node 302 may be identified as an authenticated user node or an un-authenticated user node based on the data stored with or within the data object corresponding to the node rather than by an explicit user node type or sub-type.

Figure 4A:
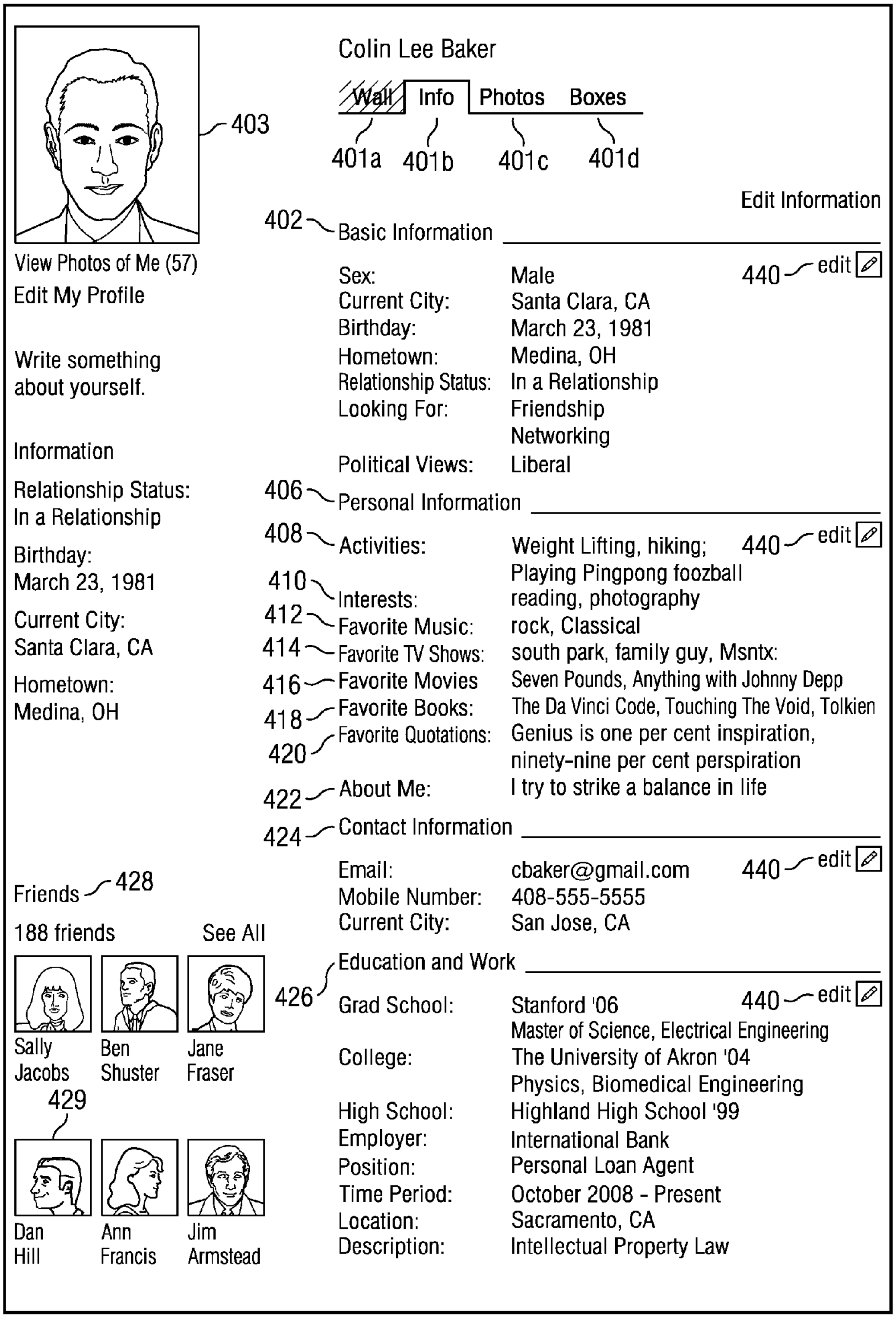
FIGS. 4A-4C illustrate an example user profile page.

FIG. 4A illustrates an example user profile page of a user corresponding to a user node 302. In particular embodiments, a user profile page is visible to the user, the user's friends, and even other non-friend users depending on privacy settings, which may be set or modified by the user via the user's profile page or a user homepage, for example. The user profile page may comprise a number of different subpages viewable or accessible via selecting one or more tabs 401. By way of example, in the embodiment illustrated in FIG. 4A, the user profile page includes a Wall (feed) tab 401*a* for accessing a wall (feed) for postings (described below), an Info tab 401*b* for entering and displaying information about or related to the user, a Photos tab 401*c* for uploading and displaying photos, and a Boxes tab 401*d*. A user may select a particular photo or picture uploaded in photos tab 401*c* for display as a user profile picture 403. In an example implementation, the user's profile picture 403 as well as other features such as, for example, the options to send a message to another user, edit the profile page, view friends of the user, or view photos of the user, may be displayed in a "chrome" (border) region of the page no matter which of tabs 401 is selected. In some implementations, a search bar or search interface is also rendered in the chrome of a user profile page (as well as other pages) enabling users to type in information such as names of other users or concepts the user desires to search for.

Generally, a great portion of, or all of, the information accessible or visible to the user and other users via the user profile page is self-declared; that is, the user types or otherwise enters information or content in various sections or forms that may or may not automatically appear by default when the user profile page is created. In particular embodiments, a user may edit his or her user profile page at anytime the user is logged into social network environment 20. By way of example, user profiles include data that describe the respective users of the social network enabled by social network environment 20, which may include, for example, proper names (first, middle and last of a person, a trade name or company name of a business entity, etc.) biographic, demographic, and other types of descriptive information in a basic information section 402 under Info tab 401*b*. The basic information section 402 may further include a user's sex, current city of residence, birthday, hometown, relationship status, political views, what the user is looking for or how the user is using the social network (e.g., for looking for friendships, relationships, dating, networking, etc.), and the like.

In particular embodiments, a user profile page may also include a personal information section 406 where the user can enter more personal declarations. By way of example, a personal information section 406 may include a sub-section 408 in which the user may declare various activities he, she, or it participates in or enjoys such as, for example, sports or music. For example, in section 408, the user may declare these activities by, for example, simply listing the activities. For example, the user may list "weight lifting, hiking, playing pingpong, and foozball," or may use phrases such as, for example, "I enjoy weightlifting, I like hiking, I love playing pingpong, I'm good at foozball." The user may separate or delineate his or her declared activities (and other declarations described below) with, for example, commas, semicolons, dashes, or carriage returns. An example personal information section 406 may also include a sub-section 410 in which the user may declare various interests. Again, the user may simply list such interests, such as by typing, for example, "reading and photography," or by using phrases such as, for example, "I like to read, I like photography." As another example, interests section 406 may include a favorite music sub-section 412 in which the user may declare music he or she likes or is interested in, a favorite TV shows sub-section 414, a favorite movies sub-section 416, a favorite books sub-section 418, a favorite quotations sub-section 420, and even a general "about me" sub-section 422 in which the user may enter general declarations about himself or herself that may not fit under the previously described sections.

In particular embodiments, a user profile page may also include a contact information section 424 in which the user may enter various contact information including, for example, email addresses, phone numbers, and city of residence. A user profile page may also include an education and work section 426 in which the user may enter his or her educational history. By way of example, a user may declare that he or she attended Stanford University in section 426 by, for example, simply typing "Stanford University," by typing "I attended Stanford University," or by selecting Stanford University from a menu interface. The user may also describe more specific information, such as, for example, the degree awarded, the field of the degree, the graduation date, etc. As another example, section 426 may enable the user to enter the user's work experience. By way of example, a user may declare that he or she works at company Z by, for example, simply typing "Company Z," by typing "I work at Company Z," or selecting company Z from a menu.

In particular embodiments, as will be described in more detail later, one or more terms in declarations entered in one or more of the previously described sections or sub-sections may be highlighted, rendered in a different color, underlined, or clickable. By way of example, one or more terms entered as declarations, and particularly terms matched to known concepts or existing concept nodes 304, may be associated with a hyperlink that, when clicked or otherwise selected, directs the user to a concept profile page devoted to the term and, in particular embodiments, having a name identical or similar to the declared term. By way of example, clicking on a hyperlink corresponding to "Family Guy" in favorite TV shows section 414 may direct the user to a web page (a concept profile page/hub as described below) devoted to the Family Guy TV show.

Figure 4B:
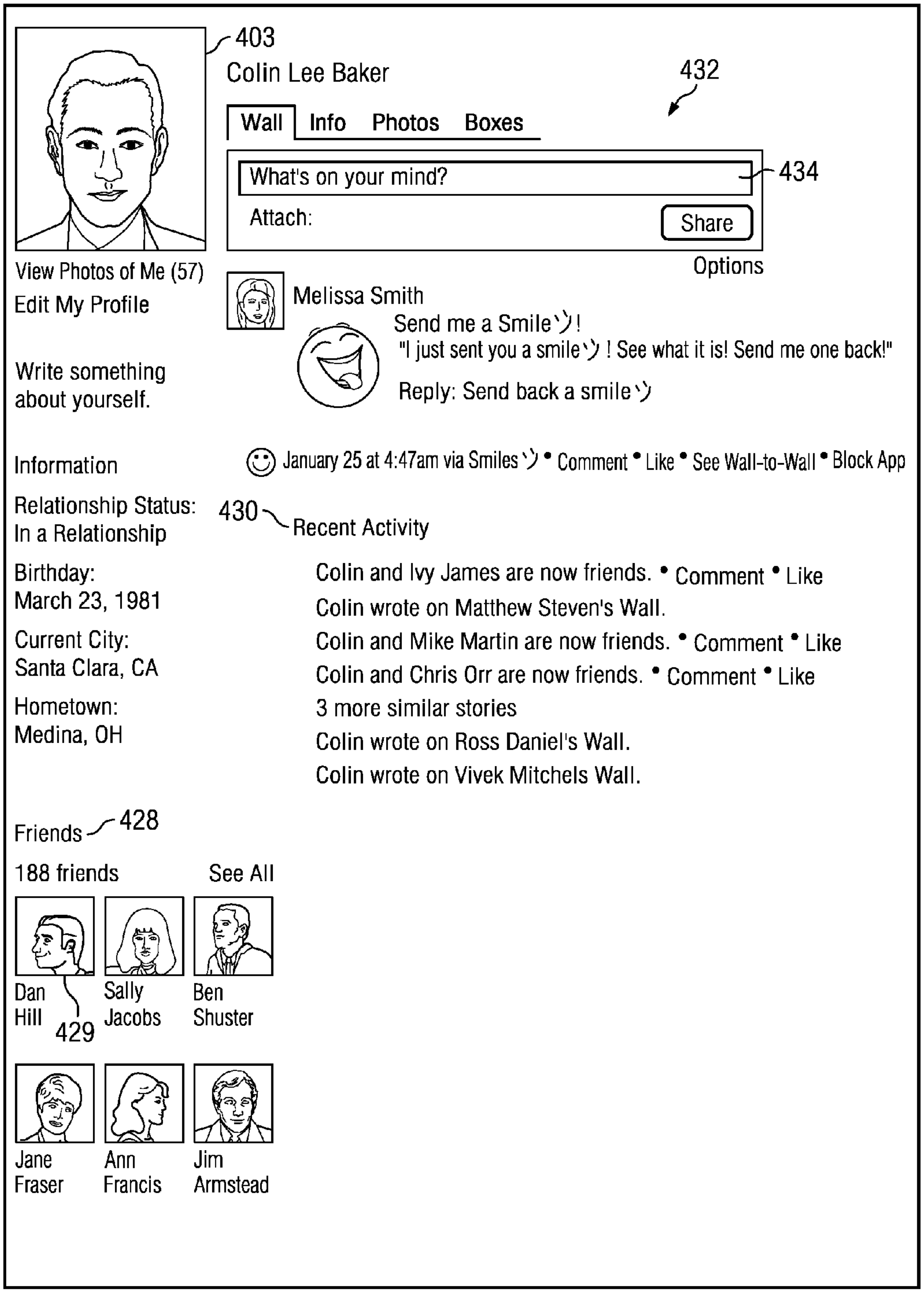
Figure 4C:
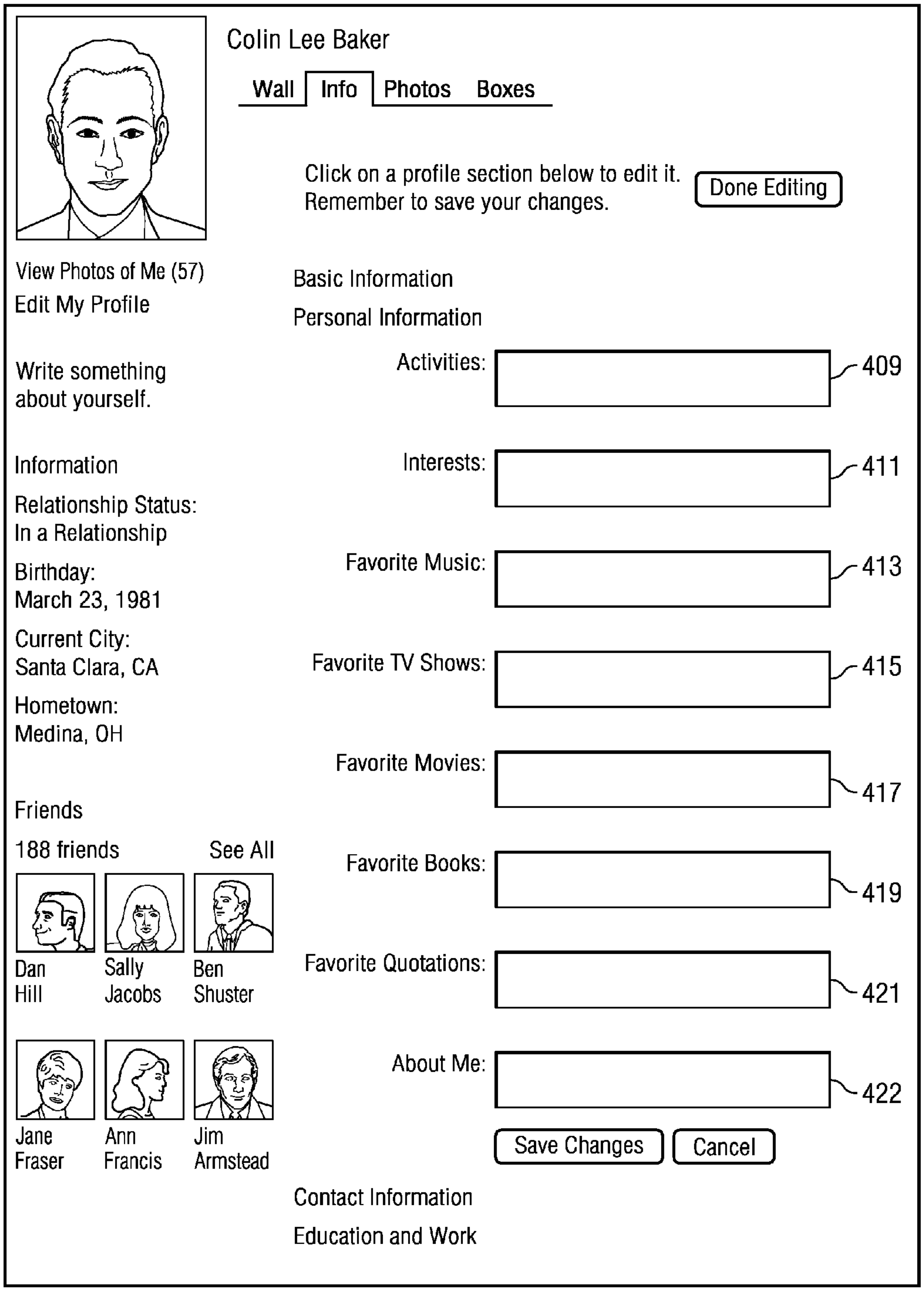

In particular embodiments, a user profile page also includes a friends section 428 (which may be visible in the chrome or other region of the page) that displays all or a subset of the user's friends as defined by edges in the social graph stored in a social graph database. In particular embodiments, the user may click on a name or thumbnail image 429 associated with a friend resulting in the directing of the user to the user profile page of the selected friend. In particular embodiments, any action that a user takes with respect to another second user, whether or not the second user may be a friend of the user or not, and, in particular embodiments, actions that the user takes with respect to various concept nodes, may be displayed in a recent activity section 430, which may be viewable as a sub-section within a wall (feed) section 432 (as shown in FIG. 4B) under Wall (feed) tab 401*a*. Generally, wall (feed) section 432 is a space on every user's profile page that allows the user and friends to post messages via input box 434 for the user and friends to see, as well as to comment or otherwise express themselves in relation to posts on the wall (feed).

In particular embodiments, the second set of un-administered nodes 304 are non-administered nodes that each correspond to a respective concept and a respective concept profile page (also referred to hereinafter as a "hub") devoted to the respective concept. In particular embodiments, un-administered nodes (also referred to as "concept nodes" or "hub nodes") 304 are nodes having respective concept profile pages (hubs) that are generally not administered by any one user; rather, in particular embodiments, hubs may generally be administered, created, and written and contributed to or modified by, at least in part, by any registered user of social network environment 20, including, in particular embodiments, users not having connections with the hub nodes 304 (that is, users whose user nodes 302 are not necessarily connected with the hub nodes 304 with edges in the social graph in social graph database). In a sense, hubs may be administered, or contributed to, by the community of registered users of social network environment 20. In particular embodiments, the second set of hub nodes 304 includes a first subset of un-administered nodes 304*a* that each correspond to a non-generic hub and a second subset of un-administered nodes 304*b* that each correspond to a generic hub. By way of example, a generic hub may be a hub devoted to an abstract activity such as running while a non-generic hub may be a hub devoted to a more specific concept, such as a profile page devoted to a particular club of runners. It should further be noted that, in various example embodiments, nodes 304*a* and 304*b* may or may not be classified distinctly as different node types; that is, in one embodiment, a hub node 304 may be identified as a generic hub node or a non-generic hub node based on the data stored with or within the data object corresponding to the hub node rather than by an explicit hub node type or sub-type.

Similar to user profile pages, concept profile pages ("hubs") share information related to the concept associated with the corresponding hub node 304. In particular embodiments, any registered user logged in to social network environment 20 and viewing a hub may add content to the hub similar to a wiki-site. FIG. 5 illustrates an example hub for the movie, "The Shawshank Redemption." In an example embodiment, and as illustrated in FIG. 5, a hub may include sub-pages accessible via wall (feed) tab 501*a*, info tab 501*b*, photos tab 501*c*, and boxes tab 501*d* similar to a user profile page. A hub may also generally include a basic information section 502, a detailed info section 504, as well as, potentially, other sections, any and all of which may generally be filled in by any user viewing the hub (although in particular embodiments, there may be a time delay associated with a content approval or synchronization process before the user-generated or user-added content is visible in the hub) or, additionally or alternately, based on extracting information from external or third-party sources (e.g., WIKIPEDIA). A hub may also include a photo or picture section under photos tab 501*c* allowing users to upload images in or related to the concept, one of which may be selected as a profile picture 512 for the hub.

In particular embodiments, wall (or news feed/activities feed) section 501*a*, or other feed or activities section of the hub, displays comments, status updates, wall posts and other user activities associated with the user and friends of the user that are viewing the hub. The wall (or news feed/activities feed) section 501*a*, or other feed or activities section of the hub may also display comments, status updates, wall posts and other user activities and user generated content that are related to the concept for which the hub was created. More particularly, one or more processes within social networking environment 20 may perform a search on comments, status updates, wall posts and other user-generated content and user activities associated with the requesting user and friends of the requesting user filtered by concept; that is, a keyword search for keywords related to the concept of the currently requested or viewed hub (and potentially keywords related to the concepts associated with the recommended hubs) in these streams of user feeds or activities related to the requesting user and the requesting user's friends, and display this subset of user content or activities in the wall or feed section 501*a* of the currently requested or viewed hub. By way of example, U.S. patent application Ser. No. 12/704,400, filed 11 Feb. 2010, and titled REAL TIME CONTENT SEARCHING IN SOCIAL NETWORK, describes methods, processes, or systems for performing such searching, filtering, and displaying, and is hereby incorporated by reference herein. Wall or feed section 501*a* may also include a section, which may be a separate section from that just described, that displays comments, status updates, wall posts and other user activities of any and all users of social networking environment 20 that are related to the concept for which the hub was created, not just those of the user and friends of the user viewing the hub.

In particular embodiments, the default sections displayed in a particular hub upon creation of the hub may depend on the concept itself; that is, hub nodes 304 may be categorized by social network environment 20, and these categories (e.g., people, places, things, activities, sports, sports teams, celebrities, cities, locations, movies, actors, books, restaurants, etc.) may dictate, at least in part, which sections are displayed on a particular hub. By way of example, a movie hub may include a section or sub-section for entering actors starring in the movie, as illustrated in FIG. 5, as well as sections or sub-sections for entering information such as the director, writer, releasing studio, release date, etc. In particular embodiments, a hub also includes a section 508 (which, in particular embodiments, may be visible no matter which of tabs 501 are currently selected) that lists or displays users that have connections (and corresponding edges in the social graph) to or with the concept, such as a fans section 508 in the example illustrated in FIG. 5. By way of example, such users may have connections, and associated edges stored in the social graph database, indicating, for example, that they like the movie, saw the movie, want to see the movie, acted in the movie, etc. In some embodiments, the users displayed in fans section 508 may only include users who are also friends with the user currently viewing the hub.

In particular embodiments, each hub also includes a recommendations section 510 (which, in particular embodiments, may be visible no matter which of tabs 501 are currently selected) that includes or displays a list or set of names 512, thumbnail images 514, or other identifiers associated with other hubs, each of which may include a hyperlink to the respective other hub. In particular embodiments, the hubs displayed or listed in recommendations section 510 have some determined relation to, or are determined based on leveraging information extracted from the social graph database about, one or more of: the particular user (also referred to hereinafter as the "requesting user") requesting or currently viewing the particular hub (also referred to hereinafter as the "requested hub"), the requested hub, friends of the user whose user nodes 302 may or may not also be connected to the requested hub's hub node 304 with respective edges, and other hubs having respective hub nodes 304 that are also connected to the requested hub's hub node 304. By way of example, the recommended hubs displayed in recommendations section 510 may include hubs that are liked or otherwise connected (with edges in the social graph database) to friends of the requesting user (as defined by edges in the social graph database), and particularly friends that are also connected to the requested hub (with edges in the social graph database). As another example, the recommended hubs displayed in recommendations section 510 may include hubs that users, and particularly friends of the requesting user (as defined by edges in the social graph database), also like or are otherwise connected to (with edges in the social graph database), but who aren't necessarily connected with the requested hub (with edges in the social graph database). As another example, the recommended hubs displayed in recommendations section 510 may include hubs that are connected to the requested hub (with edges in the social graph database) and one or more friends of the requesting user (as defined by edges in the social graph database). As another example, the recommended hubs displayed in recommendations section 510 may include hubs that are connected to the requested hub (with edges in the social graph database) but that aren't necessarily connected with friends of the requesting user (as defined by edges in the social graph database).

In particular embodiments, hub nodes 304 and their respective hubs may be explicitly created by users of social network environment 20 or generated automatically based on various criteria. In particular embodiments, hubs and their respective hub nodes 304 may be of two varieties such as, for example, whether or not they are considered or classified as generic or non-generic. In one particular implementation, hubs and their respective hub nodes 304 may be "locked" or "un-locked." Hubs may be locked at the time of creation, or other suitable time, by, for example, the creator or an administrator of social network environment 20. As described above, hubs are essentially community owned, and hence, in particular embodiments, any user of social network environment 20 may edit (e.g., add content or declarations to) hubs. However, in particular embodiments, edits in un-locked hubs may "go live" (become visible to the user or other users viewing the hub) immediately while edits in locked hubs may require approval by trusted users or administrators before being modified and presented publicly to users. Additionally, it should be noted that, in some embodiments, social network environment 20 may track which users added which content to hubs as well as when these users added the respective content.

It should also be noted that, in particular embodiments, social network environment 20 provides means or processes (e.g., selectable links or user interfaces) for the true voices of hubs corresponding to hub nodes 304 (or un-authenticated user profile pages corresponding to un-authenticated user nodes 302*b*), such as the actual celebrity or business for which a hub node 304 has previously been created, to claim these nodes thereby assuming administrative rights over them and redefining them in the social graph as, for example, registered authenticated user nodes 302*a* (or, alternately, as authenticated hub nodes 304).

As illustrated in FIG. 3, user nodes 302 and hub nodes 304 stored in the social graph database may be connected with one another via edges. As described above, in some embodiments, each edge may be classified or characterized by an edge type of a plurality of edge types that define, indicate, or characterize the connection between the pair of nodes connected by the edge. By way of example, user nodes 302 may be connected with one another via edges 306 of a first edge type. In particular embodiments, edges 306 define friendship or other social relationship connections between users (e.g., friends) associated with the respective user nodes 302. Additionally, user nodes 302 may be connected with concept nodes 304 via edges 308 of one or more second edge types. By way of example, a user corresponding to a user node 302 may make a declaration or otherwise indicate that he or she likes, is a fan of, wants, or otherwise has an interest in or association with a concept corresponding to a particular hub node 304. As discussed above, other edge types may be based on user interactions with concepts or digital objects related to a hub node, such as playing and/or sharing a song. The user may indicate this like or interest via clicking a link on the corresponding concept node's hub or by other suitable means, such as for example, clicking a link in the user's home or profile page in response to an invitation, clicking a link in a friend's profile page, or, in particular embodiments, by some automatic or automated means.

Furthermore, in some embodiments, various hub nodes 304 may be connected with one another in the social graph database via edges 310 of a third edge type. This third edge type may define an informational or categorical relationship between hub nodes 304, some of which may tend to organize such hubs into hierarchies. By way of example, a generic hub devoted to Asian food may have a link in the page to various Asian restaurants or review pages displayed in non-generic hubs. As such, in the social graph, edges 310 may connect the generic Asian food hub to one or more other generic hubs or non-generic hubs.

Additionally, in some embodiments, each edge type may include a plurality of edge sub-types that add more detail or metadata describing the specific type of connection between corresponding pairs of nodes. Furthermore, in some embodiments, new edge types may be defined or generated automatically or dynamically. By way of example, information entered into, or in relation to, third party web applications may cause new edge types to be defined and generated. As a particular example, a web application for Netflix may result in an edge type that signifies "movies I want to see."

In such embodiments in which edges have or are assigned associated edge types, the edge itself may store, or be stored with, data that defines a type of connection between the pair of nodes the edge connects, such as, for example, data describing the types of the nodes the edge connects (e.g., user, hub, category or classification of hub), access privileges of an administrator of one of the pair of nodes connected by the edge with respect to the other node the edge connects to (e.g., read or write access of an administrator of one node with respect to the other node connected by the edge), or data describing how or why the edge was first initialized or created (e.g., in response to an explicit user action or declaration, or automatically without an explicit user action), the strength of the connection as determined by various factors or criteria related to or shared by the nodes (or more particularly the users or concepts associated with the respective connected nodes) connected by the edge, among other suitable or relevant data.

In an alternate embodiment, each edge may simply define or represent a connection between nodes regardless of the types of nodes the edge connects; that is, the edge itself may store, or be stored with, identifiers of the nodes the edge connects but may not store, or be stored with, data that describes a type of connection between the pair of nodes the edge connects. Furthermore, in any of these or other embodiments, data that may indicate the type of connection or relationship between nodes connected by an edge may be stored with the nodes themselves. In particular embodiments, the edges, as well as attributes (e.g., edge type and node identifiers corresponding to the nodes connected by the edge), metadata, or other information defining, characterizing, or related to the edges, may be stored (e.g., as data objects) in the social graph database and updated periodically or in response to various actions or factors (e.g., as a user interacts more with a hub, the edge connecting the respective user and hub nodes may be updated to reflect this interaction, which may then contribute to an affinity or connection strength score characterizing the edge as described in more detail below).

In particular embodiments, social network environment 20 may leverage information extracted from both user nodes 302 as well as hub nodes 304 for various purposes or to implement or augment various existing or new features. Additionally, as a hub node 304 is populated with information entered or contributed by various users, other hub nodes 304 and respective hubs may be generated based on such information as described below. Furthermore, hubs may provide value to users in a number of manners. By way of example, if a first user visits a particular hub, the user may discover that various ones of the user's friends are also connected to that hub. For example, in an online music store, the hub may correspond to a music artist, an album or a particular song. The first user may also easily determine what other hubs those friends are connected to. Social network environment 20 may also correlate this information about the user and the user's friends to find, for example, overlapping interests or attributes, which may then be used to generate other hubs, used to generate targeted advertisements, or to make recommendations to users, such as recommended hubs.

Figure 6:
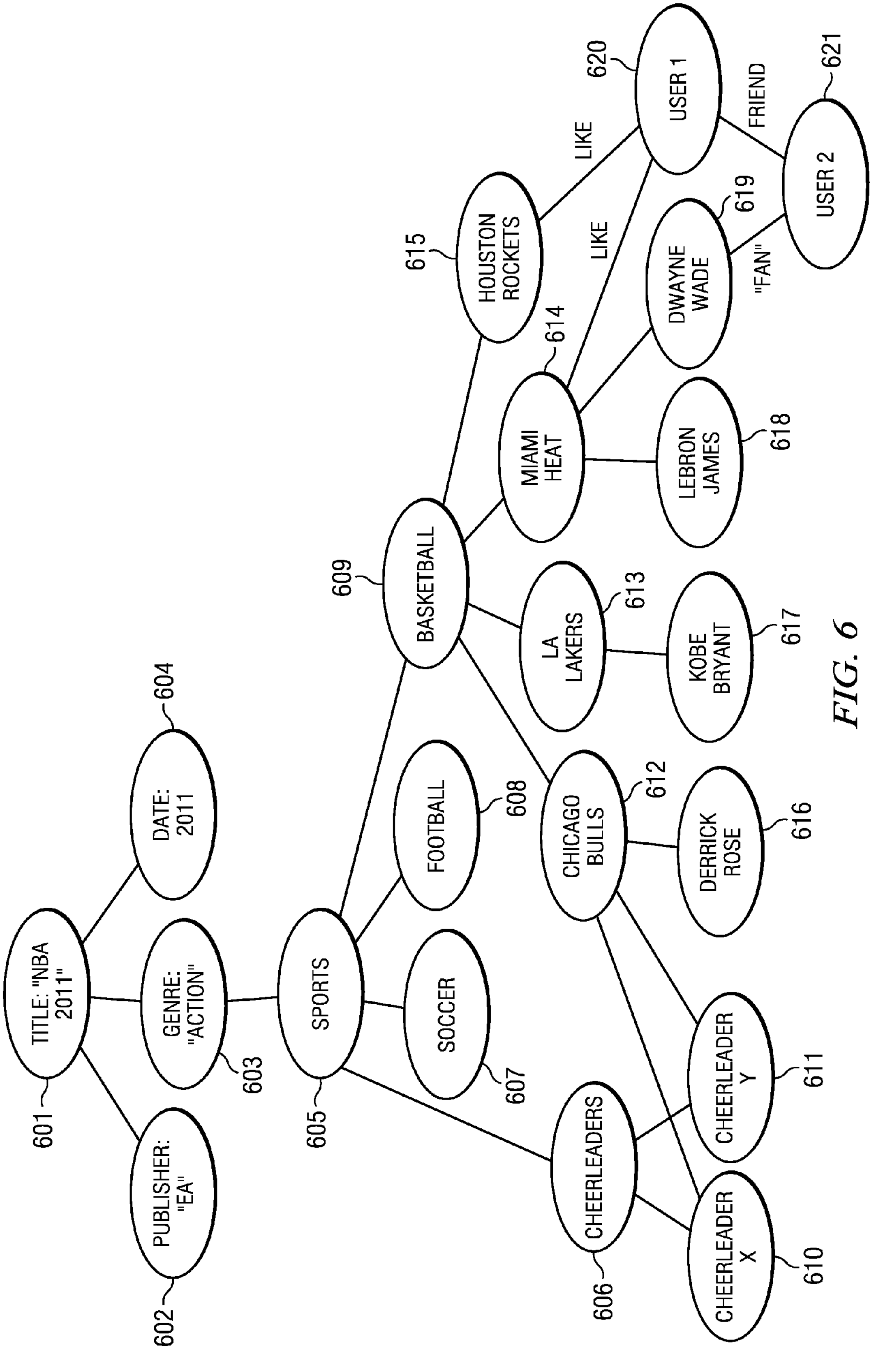
FIG. 6 shows an example social graph for calculating the relevance of an object node to a particular user node.

FIG. 6 illustrates a portion of the example social graph of FIG. 3 in a two dimensional representation. Concept nodes 601-619 represent concepts on the social network. Concept nodes 601-619 may be administered nodes or un-administered nodes. For example, node 609 ("Basketball") may be such a broad concept that it is unlikely a single user created the node. Concept nodes 601-619 may be visible concept nodes with hub pages, or attribute nodes lacking a hub page that are invisible to users of the social network. For example, node 605 ("Sports") is such a broad concept that it is unlikely to have a hub at all, and is therefore an invisible attribute node. In particular embodiments, it may be a generic hub for the concept "Sports." Concept node 601 is an object node representing an application, in this case, a game titled "NBA 2011." Object node 601 has multiple concept nodes 601-604 directly connected to it. In particular embodiments, object node 601 is explicitly created by the game publisher when it uploads the game to the application store for download by users. In such a case, the social network requires that the user creating the object node fill out predetermined fields, such as the publisher, genre, and date of the game. After receiving these values from the user, the social network matches the values with concept or attribute nodes in the social network. In this example, the values are linked to existing attribute nodes 602, 603, and 604, respectively. If a particular value entered by a user publishing an object node cannot be matched with an existing concept node, it is dynamically created.

Connected to concept node 605 ("Sports") are concept nodes representing cheerleaders 606, soccer 607, football 608, and basketball 609. Individual football and soccer teams corresponding to basketball teams 612, 613, and 614 clearly exist, but are not shown for the purposes of this diagram. Additionally, each team concept node may include multiple player concept nodes such as concept nodes 616, 617, 618, and 619. Concept node 606 ("Cheerleaders") includes two connected concept nodes 610 and 611, representing concept nodes for two different Chicago Bulls cheerleaders, as evidenced by concept edges connecting the concept node 612 to Cheerleader X (610) and Cheerleader Y (611). The complexity of the social graph increases with each node and edge added, and in many cases, cannot be rendered clearly on a two-dimensional space.

In relation to object node 601, second and third degree concept nodes 605 (Sports) and 609 (Basketball) may be similarly created as subgenre fields the user is required to fill out. In particular embodiments, second and third degree concept nodes are dynamically created by the social network through natural language processing of other information about object node 601.

User node 620 corresponds to a first user connected via a friend edge to a second user represented by user node 621. User 620 has demonstrated an affinity towards two basketball teams, the Houston Rockets and Miami Heat, represented by concept nodes 614 and 615, by "liking" them on the social network. Although User node 620 has not explicitly demonstrated an affinity toward the concept "basketball" 609, the social network may infer an affinity to concept node 609 from user node 620 because of the concept edges between concept node 614 ("Miami Heat"), concept node 615 ("Houston Rockets") and the overall concept "Basketball." Similarly, social network user 2 (user node 621) has expressed an affinity for the player "Dwyane Wade" through liking concept node 619. Thus, the social network may infer a weaker affinity from User node 621 to concept node 609.

In particular embodiments, the social network may wish to rank all or a subset of the object nodes in the social graph in order of descending relevance to a particular user. For example, when a user visits an app store to purchase a game or third-party application, it is beneficial to both the user and the object node publishers to display the objects that are the most relevant to the particular user. However, the ranking system as further described is not limited to ranking object nodes based on relevance to user nodes. In fact, the methods described herein can apply to generating a match coefficient for any node with respect to any other node.

In particular embodiments, the social graph of FIGS. 3 and 6, although represented in a two-dimensional graph, may be stored in data structures such as tables or linked lists. For example, the concept node "Sports" may include a plurality of entries, one for each sport "Basketball," "Football," "Soccer," and the like. Each of these entries includes a pointer or link to the concept node for the individual sport. For example, the entry "Basketball" in the "Sports" table may include a link to another table for "Basketball." By way of example, the table for "Basketball" may include multiple entries for each individual team, each entry comprising a pointer or a link to another table. In particular embodiments, the links or pointers to various tables may include information as to the connection type between the two tables.

Figure 7:
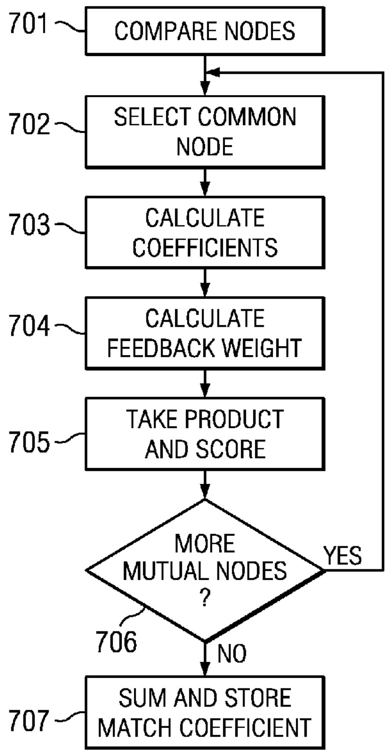
FIG. 7 shows a flowchart illustrating an example method for calculating a match coefficient between two nodes.

FIG. 7 shows a flowchart illustrating an example method, implemented by or in conjunction with one or more server-side ranking processes (hereinafter referred to as ranking process), for ranking a node for a particular user node based at least in part on information extracted from the social graph database. In particular embodiments, the ranking process leverages the social graph data from social graph database, which may include one or more searchable or queryable indexes generated by indexing the social graph database, to generate rankings based on the social graph data.

At step 701, a user node is compared to an object node. In particular embodiments, the ranking is generated for object nodes corresponding to applications or games in an application market. In particular embodiments, the object nodes correspond to songs or other media for download from a content market. In particular embodiments, any two nodes may be compared to generate a ranking based on the match coefficient between the two nodes. For example, two users may be compared via the ranking algorithm in order to determine their similarity for targeted advertising purposes.

At step 702, the ranking process selects a common attribute node connected to both the user node and the object node. For example, referencing FIG. 6, user 1 is connected to concept nodes 614 and 615 through "like" edges as first-degree connections, and via concept nodes 614 and 615, is connected to concept node 609 via a second-degree concept edge, and node 605 through a third degree concept edge. Similarly, object node 601 is connected to node 609 through a first-degree concept edge. In particular embodiments, node 609 ("basketball") is entered by the user associated with object node 601 as meta-data when object node 601 is created.

At step 703, user-attribute coefficients and object-attribute coefficients are calculated by the ranking process. The user-attribute and object-attribute coefficients represent the degree of importance the particular attribute node is to the user or object. In particular embodiments, the value of the object-attribute coefficient depends on the meta-data category it is assigned to. For example, the genre of a game or application is far more relevant to defining it than the year it was published, or the publisher. In particular embodiments, the object node administrator is prompted at object node creation to enter meta-data describing the object, and the ranking system ranks the first X meta-data tags entered as "important."

The user-attribute coefficient represents how important a particular node is to a particular user. This coefficient can be weighted in various methods. In particular embodiments, the degree of separation for the node alters the weight of the coefficient; first degree connections are more important to the user than second and third degree connections. In particular embodiments, the type of connection to a node affects the user-attribute coefficient. For example, a user becoming a "fan" of a concept node may result in the user-attribute value for the concept node being weighted higher than a concept node connected via a "like" edge. In particular embodiments, explicit graph connections are weighted higher than implied graph connections. In particular embodiments, the user-attribute coefficient is increased for second degree connections that share more first degree connections with nodes connected to the user through first degree connections. For example, if a user has ten friends who all like a particular node, that second-degree node will be ranked higher than a second-degree node that five of the user's friends like.

At step 704, a feedback weight is calculated for the particular object-attribute coefficient. A feedback weight is a value that modifies the degree of importance of a particular concept node to an object node. The feedback weight is calculated by a machine learning algorithm that monitors user interactions with an object. For example, referring once again to FIG. 6, the ranking process monitors user purchases of object 601 from an application store. The ranking process may determine that more users purchasing the game from the application store have high user-attribute coefficients for concept node 609 ("basketball"), and relatively few users purchasing the game have strong user-attribute coefficients for node 606 ("cheerleaders"). Thus, the ranking process will increase the feedback weight for "basketball" and decrease the feedback weight for "cheerleaders," thereby reducing the probability that a user who has expressed an affinity for "cheerleaders" will be displayed the game. In particular embodiments, the feedback weights are modified every time there is a user interaction with the object node, for example, downloading the application associated with the node, liking the node, posting a review of the node, or interacting with the node off the social network.

In particular embodiments, to calculate the feedback weight, the ranking process detects a user node interaction with the object node, and identifies nodes connected to both the object node and the user node. In particular embodiments, the set of mutually connected nodes may be limited to first-degree connections. In particular embodiments, the set of mutually-connected nodes is limited to the Nth degree. In particular embodiments, eedback weights corresponding to attribute nodes that are also connected to the user node are increased, while feedback weights corresponding to attribute nodes that are not connected to the user are decreased. For example, an interaction may be "liking" the node, checking-in to the node, expressing an affinity for the node, purchasing the content associated with the node, such as an application, movie, or song, posting a positive review of the node, redeeming an offer for the node, boosting the node to the user's newsfeed, or the like.

At step 705, the product of the user-attribute coefficient, object-attribute coefficient, and feedback weight is calculated and stored.

At step 706, the process repeats itself for all mutual attribute nodes connected to both the user node and the object node. In particular embodiments, the process is limited to only first-degree nodes. In particular embodiments, the process is limited to N-degree nodes. In particular embodiments, no degree of separation limitation is imposed, and the user node and object node are matched based upon all nodal connections.

At step 707, the stored products are summed to obtain an overall match coefficient for the object node to the user node. This entire process is repeated for all objects in the relevant set. For example, if the user is browsing the application store, the match coefficients for each application is calculated for that specific user. In particular embodiments, the top ten objects with the highest match coefficient are displayed to the user. In particular embodiments, the match coefficients are calculated after the set of object or concept nodes has been filtered. For example, if a user browsing a music store has limited his search to "rap and hip-hop," only match coefficients for the nodes listed in that genre are calculated.

The calculation of a match coefficient between a given user node and concept (or object) node may be represented as:

$$\sum_{i=1}^{all\_attributes} Ui * Oi * Fi, o$$

Wherein i represents the individual concept or attribute node, Ui represents the user-attribute coefficient, Oi represents the object-attribute coefficient, and Fi,o represents the feedback weight for the particular object node and attribute/concept node pair.

In particular embodiments, the feedback weight is not an explicitly defined value; in such a case object-attribute coefficient Oi is directly increased or decreased based upon observed user node interactions with the node itself.

The applications or processes described herein can be implemented as a series of computer-readable instructions, embodied or encoded on or within a tangible data storage medium, that when executed are operable to cause one or more processors to implement the operations described above. While the foregoing processes and mechanisms can be implemented by a wide variety of physical systems and in a wide variety of network and computing environments, the computing systems described below provide example computing system architectures of the server and client systems described above, for didactic, rather than limiting, purposes.

Figure 8:
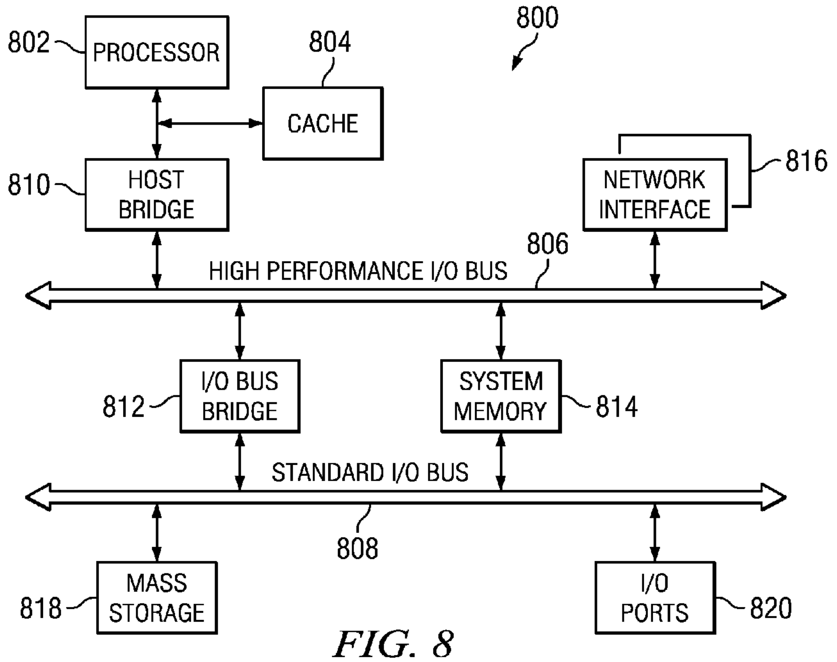
FIG. 8 illustrates an example computer system architecture.

FIG. 8 illustrates an example computing system architecture, which may be used to implement a server 22*a*, 22*b*. In one embodiment, hardware system 800 comprises a processor 802, a cache memory 804, and one or more executable modules and drivers, stored on a tangible computer readable medium, directed to the functions described herein. Additionally, hardware system 800 includes a high performance input/output (I/O) bus 806 and a standard I/O bus 808. A host bridge 808 couples processor 802 to high performance I/O bus 806, whereas I/O bus bridge 812 couples the two buses 806 and 808 to each other. A system memory 814 and one or more network/communication interfaces 816 couple to bus 806. Hardware system 800 may further include video memory (not shown) and a display device coupled to the video memory. Mass storage 818, and I/O ports 820 couple to bus 808. Hardware system 800 may optionally include a keyboard and pointing device, and a display device (not shown) coupled to bus 808. Collectively, these elements are intended to represent a broad category of computer hardware systems, including but not limited to general purpose computer systems based on the x86-compatible processors manufactured by Intel Corporation of Santa Clara, Calif., and the x86-compatible processors manufactured by Advanced Micro Devices (AMD), Inc., of Sunnyvale, Calif., as well as any other suitable processor.

The elements of hardware system 800 are described in greater detail below. In particular, network interface 816 provides communication between hardware system 800 and any of a wide range of networks, such as an Ethernet (e.g., IEEE 802.3) network, a backplane, etc. Mass storage 818 provides permanent storage for the data and programming instructions to perform the above-described functions implemented in the servers 22*a*, 22*b*, whereas system memory 814 (e.g., DRAM) provides temporary storage for the data and programming instructions when executed by processor 802. I/O ports 620 are one or more serial and/or parallel communication ports that provide communication between additional peripheral devices, which may be coupled to hardware system 800.

Hardware system 800 may include a variety of system architectures; and various components of hardware system 800 may be rearranged. For example, cache 804 may be on-chip with processor 802. Alternatively, cache 804 and processor 802 may be packed together as a "processor module," with processor 802 being referred to as the "processor core." Furthermore, certain embodiments of the present invention may not require nor include all of the above components. For example, the peripheral devices shown coupled to standard I/O bus 808 may couple to high performance I/O bus 806. In addition, in some embodiments, only a single bus may exist, with the components of hardware system 800 being coupled to the single bus. Furthermore, hardware system 800 may include additional components, such as additional processors, storage devices, or memories.

In one implementation, the operations of the embodiments described herein are implemented as a series of executable modules run by hardware system 800, individually or collectively in a distributed computing environment. In a particular embodiment, a set of software modules and/or drivers implements a network communications protocol stack, browsing and other computing functions, optimization processes, and the like. The foregoing functional modules may be realized by hardware, executable modules stored on a computer readable medium, or a combination of both. For example, the functional modules may comprise a plurality or series of instructions to be executed by a processor in a hardware system, such as processor 802. Initially, the series of instructions may be stored on a storage device, such as mass storage 818. However, the series of instructions can be tangibly stored on any suitable storage medium, such as a diskette, CD-ROM, ROM, EEPROM, etc. Furthermore, the series of instructions need not be stored locally, and could be received from a remote storage device, such as a server on a network, via network/communications interface 816. The instructions are copied from the storage device, such as mass storage 818, into memory 814 and then accessed and executed by processor 802.

An operating system manages and controls the operation of hardware system 800, including the input and output of data to and from software applications (not shown). The operating system provides an interface between the software applications being executed on the system and the hardware components of the system. Any suitable operating system may be used, such as the LINUX Operating System, the Apple Macintosh Operating System, available from Apple Computer Inc. of Cupertino, Calif., UNIX operating systems, Microsoft® Windows® operating systems, BSD operating systems, and the like. Of course, other implementations are possible. For example, the nickname generating functions described herein may be implemented in firmware or on an application specific integrated circuit.

Furthermore, the above-described elements and operations can be comprised of instructions that are stored on storage media. The instructions can be retrieved and executed by a processing system. Some examples of instructions are software, program code, and firmware. Some examples of storage media are memory devices, tape, disks, integrated circuits, and servers. The instructions are operational when executed by the processing system to direct the processing system to operate in accord with the invention. The term "processing system" refers to a single processing device or a group of inter-operational processing devices. Some examples of processing devices are integrated circuits and logic circuitry. Those skilled in the art are familiar with instructions, computers, and storage media.

The present disclosure encompasses all changes, substitutions, variations, alterations, and modifications to the example embodiments herein that a person having ordinary skill in the art would comprehend. Similarly, where appropriate, the appended claims encompass all changes, substitutions, variations, alterations, and modifications to the example embodiments herein that a person having ordinary skill in the art would comprehend. By way of example, while embodiments of the present invention have been described as operating in connection with a social networking website, the present invention can be used in connection with any communications facility that supports web applications. Furthermore, in some embodiments the term "web service" and "web-site" may be used interchangeably and additionally may refer to a custom or generalized API on a device, such as a mobile device (e.g., cellular phone, smart phone, personal GPS, personal digital assistance, personal gaming device, etc.), that makes API calls directly to a server.

What is claimed is:

1. A method comprising:

by a computer server, accessing, in a social graph associated with one or more computing systems of a social network environment, a user node representing a particular user, the user node connected to a plurality of attribute nodes; and by the computer server, for each of a plurality of object nodes in the social graph, each object node connected to a plurality of attribute nodes, calculating a match coefficient between the user node and an individual object node, wherein the calculating comprises:

calculating, for each attribute node in a set of all attribute nodes connected to both the user node and the object node, a first coefficient between the user node and the attribute node and a second coefficient between the object node and the attribute node; and obtaining the sum-product of all the first and second coefficients.

2. The method of claim 1, wherein the first coefficient decreases as the degree of separation between the user node and the attribute node increases, and the second coefficient decreases as the degree of separation between the object node and the attribute node increases.

3. The method of claim 1, wherein each of the second coefficients is multiplied by a feedback weight for its associated attribute node and object node pair.

4. The method of claim 3, wherein the feedback weight is calculated via a machine learning algorithm.

5. The method of claim 4, wherein the feedback weight for each attribute node and object node pair is calculated by:

monitoring all user node interaction with the object node;

for each user node interaction with the object node:

determining whether the attribute node is also connected to the user node;

as a result of a positive determination; incrementing the feedback weight; and as a result of a negative determination, decrementing the feedback weight.

6. The method of claim 5, wherein the type of user node interaction with the object node determines the amount by which the feedback weights are incremented or decremented.

7. The method of claim 1, wherein attribute nodes connected to the particular user node comprises affinities calculated from the social graph.

8. The method of claim 7, wherein the social graph comprises information from the particular user's profile.

9. The method of claim 7, wherein the social graph comprises the user's actions in the social network environment.

10. The method of claim 7, wherein the social graph comprises the user's actions on Internet-connected nodes external to the social network environment.

11. The method of claim 7, wherein the social graph comprises common keywords in the user's messages.

12. The method of claim 5, wherein the attribute nodes comprise metadata tags.

13. The method of claim 12, wherein the metadata tags are received from a node administrator associated with a particular object node.

14. The method of claim 13, wherein the received metadata tags are initially assigned a predetermined feedback weight.

15. The method of claim 1, further comprising promoting nodes with a match coefficient exceeding a predetermined threshold to the particular user.

16. The method of claim 1, further comprising ranking all nodes by descending match coefficient for display to the particular user.

17. The method of claim 1, wherein attribute nodes comprise concept nodes.

18. The method of claim 17, wherein object nodes comprise concept nodes.

19. The method of claim 17, wherein concept nodes are dynamically generated by the social graph.

20. One or more computer-readable non-transitory storage media in one or more computing systems, the media embodying logic that is operable when executed to:

access, in a social graph associated with one or more computing systems of a social network environment, a user node representing a particular user, the user node connected to a plurality of attribute nodes; and for each of a plurality of object nodes in the social graph, each object node connected to a plurality of attribute nodes, calculate a match coefficient between the user node and an individual object node, wherein the calculating comprises:

calculating, for each attribute node in a set of all attribute nodes connected to both the user node and the object node, a first coefficient between the user node and the attribute node and a second coefficient between the object node and the attribute node; and obtaining the sum-product of all the first and second coefficients.

21. The media of claim 20, wherein the first coefficient decreases as the degree of separation between the user node and the attribute node increases, and the second coefficient decreases as the degree of separation between the object node and the attribute node increases.

22. The media of claim 20, wherein each of the second coefficients is multiplied by a feedback weight for its associated attribute node and object node pair.

23. The media of claim 22, wherein the feedback weight is calculated via a machine learning algorithm.

24. The media of claim 23, wherein the feedback weight for each attribute node and object node pair is calculated by:

monitoring all user node interaction with the object node;

for each user node interaction with the object node:

determining whether the attribute node is also connected to the user node;

as a result of a positive determination; incrementing the feedback weight; and as a result of a negative determination, decrementing the feedback weight.

25. The media of claim 24, wherein the type of user node interaction with the object node determines the amount by which the feedback weights are incremented or decremented.

26. The media of claim 20, wherein attribute nodes connected to the particular user node comprises affinities calculated from the social graph.

27. The media of claim 26, wherein the social graph comprises information from the particular user's profile.

28. The media of claim 26, wherein the social graph comprises the user's actions in the social network environment.

29. The media of claim 26, wherein the social graph comprises the user's actions on Internet-connected nodes external to the social network environment.

30. The media of claim 26, wherein the social graph comprises common keywords in the user's messages.

31. The media of claim 24, wherein the attribute nodes comprise metadata tags.

32. The media of claim 31, wherein the metadata tags are received from a node administrator associated with a particular object node.

33. The media of claim 32, wherein the received metadata tags are initially assigned a predetermined feedback weight.

34. The media of claim 20, further comprising promoting nodes with a match coefficient exceeding a predetermined threshold to the particular user.

35. The media of claim 20, further comprising ranking all nodes by descending match coefficient for display to the particular user.

36. The media of claim 20, wherein attribute nodes comprise concept nodes.

37. The media of claim 36, wherein object nodes comprise concept nodes.

38. The media of claim 36, wherein concept nodes are dynamically generated by the social graph.

39. A system comprising:

one or more processors; and a memory coupled to the processors comprising instructions executable by the processors, the processors being operable when executing the instructions to:

access, in a social graph associated with one or more computing systems of a social network environment, a user node representing a particular user, the user node connected to a plurality of attribute nodes; and for each of a plurality of object nodes in the social graph, each object node connected to a plurality of attribute nodes, calculate a match coefficient between the user node and an individual object node, wherein the calculating comprises:

calculating, for each attribute node in a set of all attribute nodes connected to both the user node and the object node, a first coefficient between the user node and the attribute node and a second coefficient between the object node and the attribute node; and obtaining the sum-product of all the first and second coefficients.

40. The system of claim 39, wherein the first coefficient decreases as the degree of separation between the user node and the attribute node increases, and the second coefficient decreases as the degree of separation between the object node and the attribute node increases.

41. The system of claim 39, wherein each of the second coefficients is multiplied by a feedback weight for its associated attribute node and object node pair.

42. The system of claim 41, wherein the feedback weight is calculated via a machine learning algorithm.

43. The system of claim 42, wherein the feedback weight for each attribute node and object node pair is calculated by:

monitoring all user node interaction with the object node;

for each user node interaction with the object node:

determining whether the attribute node is also connected to the user node;

as a result of a positive determination; incrementing the feedback weight; and as a result of a negative determination, decrementing the feedback weight.

44. The system of claim 43, wherein the type of user node interaction with the object node determines the amount by which the feedback weights are incremented or decremented.

45. The system of claim 39, wherein attribute nodes connected to the particular user node comprises affinities calculated from the social graph.

46. The system of claim 45, wherein the social graph comprises information from the particular user's profile.

47. The system of claim 45, wherein the social graph comprises the user's actions in the social network environment.

48. The system of claim 45, wherein the social graph comprises the user's actions on Internet-connected nodes external to the social network environment.

49. The system of claim 45, wherein the social graph comprises common keywords in the user's messages.

50. The system of claim 43, wherein the attribute nodes comprise metadata tags.

51. The system of claim 50, wherein the metadata tags are received from a node administrator associated with a particular object node.

52. The system of claim 51, wherein the received metadata tags are initially assigned a predetermined feedback weight.

53. The system of claim 39, further comprising promoting nodes with a match coefficient exceeding a predetermined threshold to the particular user.

54. The system of claim 39, further comprising ranking all nodes by descending match coefficient for display to the particular user.

55. The system of claim 39, wherein attribute nodes comprise concept nodes.

56. The system of claim 55, wherein object nodes comprise concept nodes.

57. The system of claim 55, wherein concept nodes are dynamically generated by the social graph.

* * * * *